(12) United States Patent
Nakamae et al.

(10) Patent No.: US 8,008,600 B2
(45) Date of Patent: Aug. 30, 2011

(54) FIBER LASER APPARATUS

(75) Inventors: Kazuo Nakamae, Yokohama (JP); Motoki Kakui, Yokohama (JP); Shinobu Tamaoki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1055 days.

(21) Appl. No.: 11/808,927

(22) Filed: Jun. 13, 2007

(65) Prior Publication Data

US 2008/0123694 A1    May 29, 2008

(30) Foreign Application Priority Data

Jun. 13, 2006  (JP) ................. P2006-163641

(51) Int. Cl.
*B23K 26/06* (2006.01)
*H01S 3/067* (2006.01)
*H04B 10/12* (2006.01)
*G02B 6/036* (2006.01)

(52) U.S. Cl. ............. 219/121.73; 359/341.1; 359/341.3; 359/341.32; 372/6; 385/126

(58) Field of Classification Search ............... 372/6, 19, 372/25, 69, 70, 71; 359/341.1, 341.3, 341.31, 359/341.32, 341.33; 385/126, 127; 219/121.6, 219/121.73
See application file for complete search history.

(56) References Cited

U.S. PATENT DOCUMENTS

| 6,275,250 | B1 * | 8/2001 | Sanders et al. ................ 385/126 |
| 6,463,083 | B1 * | 10/2002 | Sumiyoshi et al. .............. 372/6 |
| 6,885,683 | B1 * | 4/2005 | Fermann et al. ................ 372/25 |
| 7,317,857 | B2 * | 1/2008 | Manyam et al. ............. 385/127 |
| 7,839,902 | B2 * | 11/2010 | Li et al. ............................ 372/6 |
| 2005/0243409 | A1 * | 11/2005 | Harter et al. ................ 359/341.1 |
| 2005/0265678 | A1 * | 12/2005 | Manyam et al. .............. 385/127 |
| 2007/0171516 | A1 * | 7/2007 | Tamaoki et al. ............ 359/337.4 |
| 2007/0216995 | A1 * | 9/2007 | Bollond et al. .......... 359/341.32 |
| 2008/0030847 | A1 * | 2/2008 | Murison et al. ............ 359/341.3 |
| 2008/0219299 | A1 * | 9/2008 | Lewis ........................ 359/341.3 |

FOREIGN PATENT DOCUMENTS

JP    2000-340872    12/2000

(Continued)

OTHER PUBLICATIONS

Galvanauskas et al., "Generation of high-energy femtosecond pulses in multimode-core YB-fiber chirped pulse amplification systems", Jun. 2001, Optics Letters, vol. 26, No. 12, pp. 935-937.* "Processing Technology Using High-output Laser, In-process Monitoring and Evaluation of Processing State"., Gijutsu Joho Kyokai, May 9, 2005, p. 70.
Japanese Notice of Allowance, w/ partial English translation, issued in Japanese Patent Application No. JP 2006-163641 dated Jun. 14, 2011.

*Primary Examiner* — Geoffrey S Evans
(74) *Attorney, Agent, or Firm* — McDermott Will & Emery LLP (57) ABSTRACT

The fiber laser apparatus comprises an amplifying section for amplifying seed light by cladding-pumping, and has a structure for further using a residual component of pumping light for cladding-pumping in order to heat the object. A guiding optical fiber is provided between an amplifying optical fiber of the amplifying section and an output optical system converging the single-mode amplified seed light on the object, the guiding optical fiber serving to increase the degree of freedom in arranging the output optical system. The guiding optical fiber has a structure enabling the single-mode propagation of the amplified seed light outputted from the amplifying optical fiber and multimode propagation of the residual pumping light. Because the object is irradiated with the converged amplified seed light, while being heated with the residual pumping light outputted from the output optical system, even an object with a complex shape can be subjected to efficient laser processing.

6 Claims, 4 Drawing Sheets

FOREIGN PATENT DOCUMENTS

| | | |
|---|---|---|
| JP | 2005-503008 T | 1/2005 |
| JP | 2005-512332 T | 4/2005 |
| JP | 2005-313195 | 11/2005 |
| JP | 2006-093613 | 4/2006 |
| WO | WO 2005/032752 A1 | 4/2005 |
| WO | WO-2005-053895 A1 * | 6/2005 |
| WO | WO-2007/148127 A2 * | 12/2007 |

* cited by examiner

FIBER LASER APPARATUS

BACKGROUND OF THE INVENTION

1. Field of the Invention

The present invention relates to a fiber laser apparatus comprising an amplifying optical fiber and to a laser processing method using the fiber laser apparatus.

2. Related Background Art

A fiber laser apparatus comprises an amplifying optical fiber, and by supplying pumping light together with seed light, the seed light is amplified as a processing laser beam. Since such a fiber laser apparatus can output a high-quality and high-power laser beam, it can be advantageously used in the field for laser processing. An apparatus disclosed in "Processing Technology Using High-output Laser, In-process Monitoring and Evaluation of Processing State", published on May 9, 2005, by Gijutsu Joho Kyokai, is known as a conventional fiber laser apparatus.

SUMMARY OF THE INVENTION

The inventors have studied the above prior arts in detail, and as a result, have found problems as follows. Namely, in laser processing using the conventional fiber laser apparatus, some objects, e.g. objects having a complex shape, are difficult to process efficiently. Furthermore, in a laser processing that the conventional fiber laser apparatus is used, it is difficult to shorten the processing time.

In order to overcome the above-mentioned problems, it is an object of the present invention to provide a fiber laser apparatus having a structure that enables efficient laser processing for objects and a laser processing method.

To resolve the aforementioned problems, the fiber laser apparatus according to the present invention comprises an amplifying section for amplifying seed light by cladding-pumping and has a structure for further using a residual component of pumping light for cladding-pumping in order to heat the object. More specifically, the fiber laser apparatus comprises a seed light source, an amplifying section for amplifying the seed light by cladding-pumping, an output optical system for irradiating an object with light components outputted from the amplifying section, and a guiding optical fiber provided between the amplifying section and the output optical system.

The seed light source outputs seed light that will serve as a processing laser beam. The amplifying section comprises an amplifying optical fiber, a pumping light source, and an optical multiplexer. The amplifying optical fiber has a core (including a photoactive element contributing to optical amplification) extending along a predetermined axis, an inner cladding provided on an outer periphery of the core and having a refractive index lower than that of the core, and an outer cladding provided on an outer periphery of the inner cladding and having a refractive index lower than that of the inner cladding. The pumping light source outputs pumping light with a predetermined wavelength. The optical multiplexer functions to supply the seed light from the seed light source to the core of the amplifying optical fiber and also to supply the pumping light from the pumping light source to the inner cladding of the amplifying optical fiber. In such a structure, the amplifying optical fiber outputs single-mode amplified seed light that has been amplified by cladding-pumping and also outputs multimode residual pumping light that remained unabsorbed. The output optical system irradiates the object with the single-mode amplified seed light and multimode residual pumping light that are outputted from the amplifying optical fiber. In particular, the output optical system converges the single-mode amplified seed light on the object. The guiding optical fiber guides the single-mode amplified seed light and multimode residual pumping light outputted from the amplifying optical fiber to the output optical system. The guiding optical fiber increases the degree of freedom in arranging the output optical fiber. The guiding optical fiber has a core extending along a predetermined axis, an inner cladding provided on an outer periphery of the core and having a refractive index lower than that of the core, and an outer cladding provided on an outer periphery of the inner cladding and having a refractive index lower than that of the inner cladding. Therefore, the single-mode amplified seed light outputted from the amplifying optical fiber propagates mainly in the core of the guiding fiber, whereas the multimode residual pumping light outputted from the amplifying optical fiber propagates mainly in the core and inner cladding of the guiding optical fiber.

The fiber laser apparatus according to the present invention may further comprise a heating light source outputting multimode light with a wavelength different from that of the pumping light, this multimode light serving as heating light for heating the object. In this case, the heating light from the heating light source may be supplied into the amplifying optical fiber from the light incidence end of the amplifying optical fiber (the heating light reaches the output optical system after successively propagating in the amplifying optical fiber and guiding optical fiber), or may be supplied into the guiding optical fiber from the light incidence end of the guiding optical fiber (the heating light reaches the output optical system after propagating in the guiding optical fiber, without propagating in the amplifying optical fiber). The light is supplied to the amplifying optical fiber from the light incidence end of the amplifying optical fiber through the optical multiplexer.

When the heating light from the heating light source is supplied into the amplifying optical fiber from the light incidence end of the amplifying optical fiber, the heating light is supplied into the amplifying optical fiber through the optical multiplexer disposed at the light incidence end side of the amplifying optical fiber. On the other hand, when the heating light from the heating light source is supplied into the guiding optical fiber from the light incidence end of the guiding optical fiber, the heating light is supplied into the guiding optical fiber through a different optical multiplexer. In either configuration, the heating light source preferably outputs continuous light as multimode heating light to heat the object efficiently.

In the fiber laser apparatus according to the present invention, the core of the amplifying optical fiber is preferably doped with ytterbium of a concentration-length product such that unsaturated absorption of the amplifying optical fiber becomes 3 dB or more but 13 dB or less at a wavelength of the pumping light.

The laser processing method according to the present invention employs the fiber laser apparatus having the above-described structure (fiber laser apparatus according to the present invention). Thus, the laser processing method comprises the steps of preparing a fiber laser apparatus having the above-described structure; arranging the output optical system with respect to the object; and converging the single-mode amplified seed light on the object, while irradiating the object with the multimode residual pumping light (laser processing). In particular, in the step of arranging the output optical system, the output optical system is arranged such that the processing area of the object matches a convergence point of single-mode amplified seed light that is outputted from the fiber laser apparatus. The degree of freedom in arranging the output optical system is increased by providing a guiding optical fiber between the amplifying optical fiber and the output optical system. Further, in the irradiation step, the object is simultaneously irradiated with both single-mode amplified seed light and multimode residual pumping light that are guided into the output optical system from the amplifying optical fiber of the fiber laser apparatus through the guiding optical fiber.

In the laser processing method according to the present invention, during simultaneous irradiation with the single-mode amplified seed light and the multimode residual pumping light, the object may be further irradiated, through the output optical system, with multimode heating light having a wavelength different from that of the pumping light. By further irradiating the object with the light for heating together with the residual pumping light, the efficiency of laser processing of the object can be further increased.

The multimode heating light that irradiates the object separately from the residual pumping light preferably has a wavelength that is readily absorbed by the material of the object. For example, when at least the processing area of the object is from an aluminum material, the multimode heating light may have a wavelength of 400 nm or more but 980 nm or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of a fiber laser apparatus and laser processing method according to the present invention will be explained in detail with reference to FIGS. 1 to 3, 4A and 4B. In the explanation of the drawings, constituents identical to each other will be referred to with numerals identical to each other without repeating their overlapping descriptions.

Embodiment 1

Figure 1:
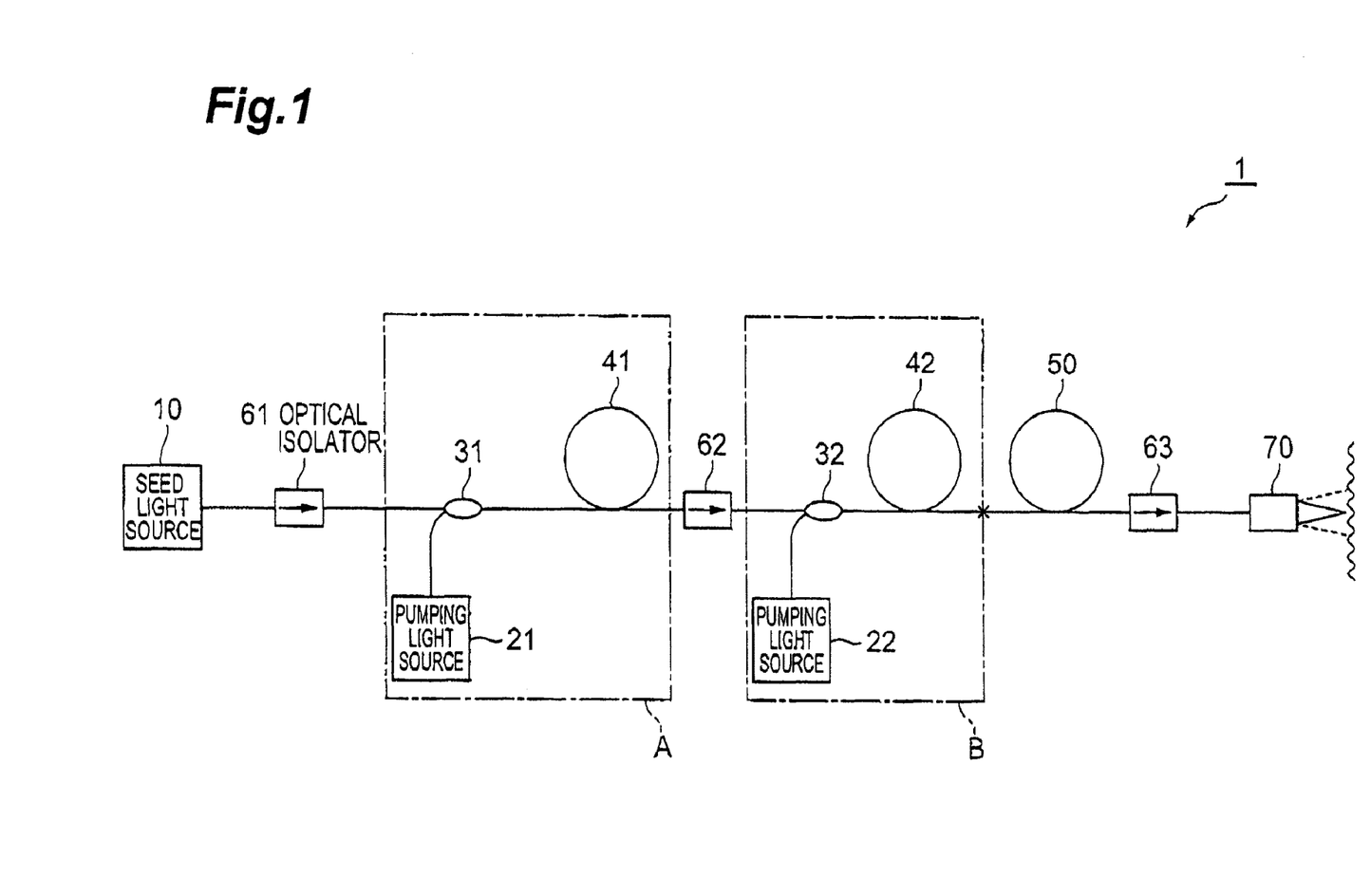
FIG. 1 is a view showing a configuration of a first embodiment of a fiber laser apparatus according to the present invention.
Figure 2:
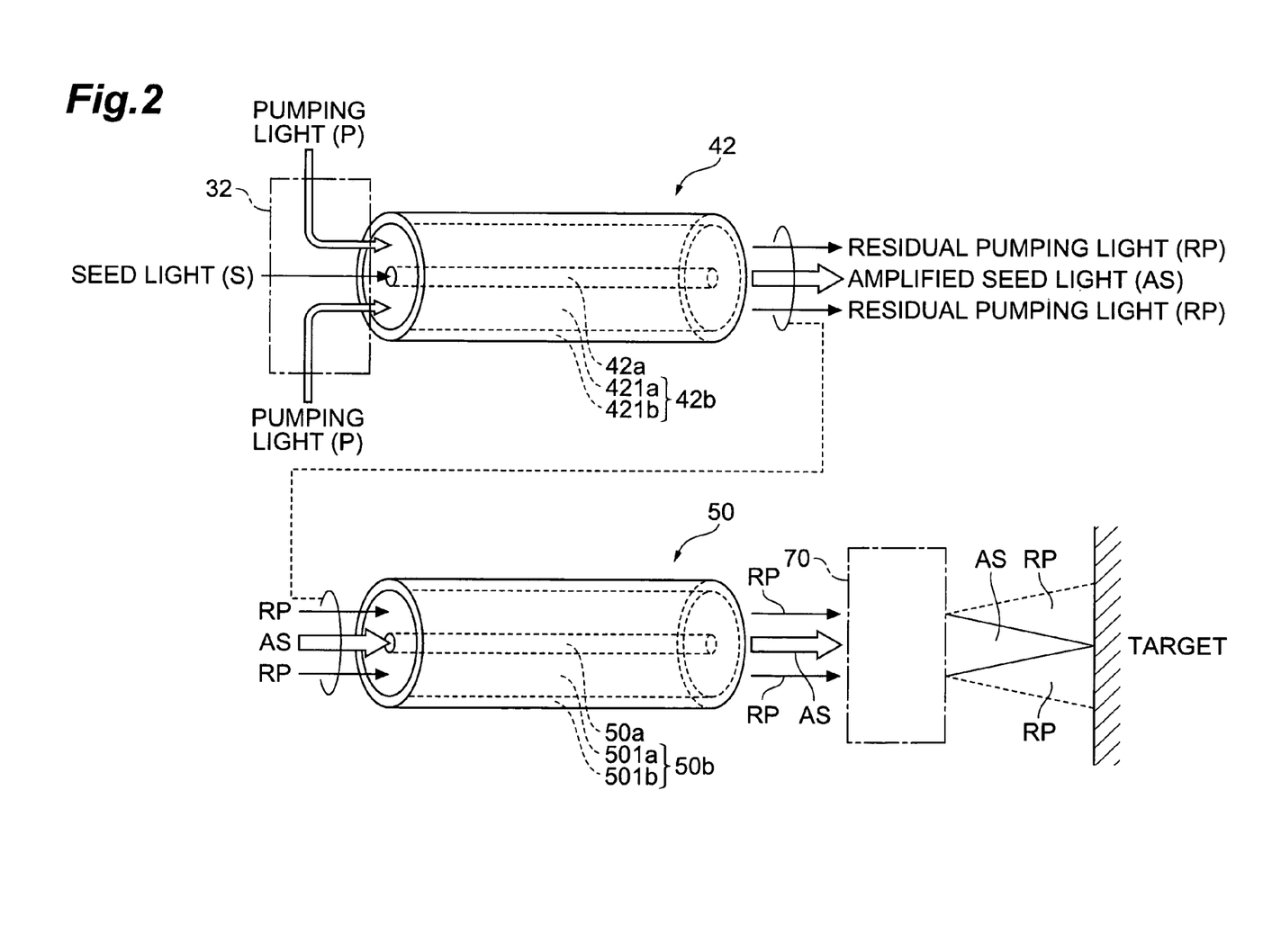
FIG. 2 is a view showing a specific configuration of a main part in the fiber laser apparatus shown in FIG. 1.

First, a first embodiment of a fiber laser apparatus and laser processing method according to the present invention will be explained. FIG. 1 is a view showing a configuration of a first embodiment of a fiber laser apparatus according to the present invention. FIG. 2 is a view showing a specific configuration of main part of the fiber laser apparatus shown in FIG. 1. A fiber laser apparatus 1 according to the first embodiment has a MOPA (Main Oscillation Power Amplifier) configuration, as shown in FIG. 1, that comprises a seed light source 10, pumping light sources 21, 22, optical multiplexers 31, 32, amplifying optical fibers 41, 42, a guiding optical fiber 50, optical isolators 61 to 63, and an output optical system 70. A pre-amplifying section A is constituted by the pumping light source 21, optical multiplexer 31 and amplifying optical fiber 41, and then a main amplifying section B of a cladding-pumping type is constituted by the pumping light source 22, optical multiplexer 32, and amplifying optical fiber 42.

The optical isolator 61, the optical multiplexer 31, the amplifying optical fiber 41, the optical isolator 62, the optical multiplexer 32, the amplifying optical fiber 42, the guiding optical fiber 50, and the optical isolator 63 are arranged on the optical path from the seed light source 10 to the output optical system 70 in the order of description from the seed light source 10 to the output optical system 70. Furthermore, the pumping light source 21 is connected to the optical multiplexer 31, and the pumping light source 22 is connected to the optical multiplexer 32.

The amplifying optical fibers 41, 42 are optical fibers having a core doped with a rare earth element (preferably, Yb element), and light with a predetermined wavelength is amplified by supplying an pumping light with a wavelength capable of pumping the rare earth element into the optical fibers.

Here, the amplifying optical fiber 41 included in the pre-amplifying section A is a single-mode optical fiber having a core doped with Yb element. When an inputted seed light (light to be amplified) and pumping light propagate in the core of the amplifying optical fiber 41, the seed light undergoes primary amplification.

The amplifying optical fiber 42 included in the main amplifying section B comprises a core 42a and a cladding region 42b provided on the outer periphery of the core 42a, as shown in FIG. 2. The cladding region 42b comprises an inner cladding 421a that is provided on the outer periphery of the core 42a and has a refractive index lower than that of the core 42a, and an outer cladding 421b that is provided on the outer periphery of the inner cladding 421a and has a refractive index lower than that of the inner cladding 421a. Thus, the amplifying optical fiber 42 included in the main amplifying section B has a double-cladding structure. Furthermore, the core 42a and inner cladding 421a of the amplifying optical fiber 42 are doped with the Yb element. The incident light (seed light amplified in the amplifying optical fiber 41) propagates as a single-mode light in the core 42a of the amplifying optical fiber 42, whereas the pumping light supplied through the optical multiplexer 32 propagates as a multimode light in the core 42a and inner cladding 421a of the amplifying optical fiber 42. The amplifying optical fiber 42 preferably has a concentration-length product such that an unsaturated absorption at a wavelength of the pumping light is 3 dB or more but 13 dB or less.

As shown in FIG. 2, the guiding optical fiber 50 has a double cladding structure substantially identical to that of the amplifying optical fiber 42. Thus, the guiding optical fiber 50 comprises a core 50a and a cladding region 50b provided on the outer periphery of the core 50a. The cladding region 50b comprises an inner cladding 501a that is provided on the outer periphery of the core 50a and has a refractive index lower than that of the core 50a, and an outer cladding 501b that is provided on the outer periphery of the inner cladding 501a and has a refractive index lower than that of the inner cladding 501a. The core 50a of the guiding optical fiber 50 is not doped with a rare earth element such as Yb element. Thus, the guiding optical fiber 50 is connected by fusing as a flexible connection member having no optical amplification function to the amplifying optical fiber 42 (the guiding optical fiber 50 and the amplifying optical fiber 42 may be also connected in a contactless manner through a connector). The amplified seed light outputted from the amplifying optical fiber 42 (single-mode light that has been amplified in the amplifying optical fiber 42) propagates as single-mode light inside the core 50a of the guiding optical fiber 50, whereas the residual pumping light that has been outputted from the amplifying optical fiber 42 propagates as multimode light in the core 50a and inner cladding 501a of the guiding optical fiber 50. The amplified seed light and residual pumping light propagating in such a manner are introduced into the output optical system 70. The length of the guiding optical fiber 50 is preferably, for example, 1 m with consideration for operability.

The seed light source 10 outputs seed light with a wavelength of 1064 nm that has to be amplified by the amplifying optical fibers 41, 42. The pumping light source 21 outputs pumping light with a wavelength of 980 nm that has to be supplied into the amplifying optical fiber 41. The pumping light source 22 outputs pumping light with a wavelength of 980 nm that has to be supplied into the amplifying optical fiber 42. These seed light source 10 and pumping light sources 21, 22 are preferably laser diodes.

The optical multiplexer 31 outputs the seed light that passed the optical isolator 61, together with the pumping light that arrived from the pumping light source 21, to the amplifying optical fiber 41. The optical multiplexer 32 outputs the seed light that passed the optical isolator 62, together with the pumping light that arrived from the pumping light source 22, to the amplifying optical fiber 42.

The optical isolators 61 to 63 are optical devices that transmit light with a low loss in the forward direction from the seed light source 10 to the output optical system 70, but do not transmit light in the opposite direction. The output optical system 70 focuses laser light for processing that is outputted from the optical isolator 63 on an object to be processed.

In the fiber laser apparatus 1 according to the first embodiment, the pumping light outputted from the pumping light source 21 is supplied into the amplifying optical fiber 41 through the optical multiplexer 31 and causes pumping of the Yb element added to the core of the amplifying optical fiber 41. The pumping light outputted from the pumping light source 22 is supplied into the amplifying optical fiber 42 through the optical multiplexer 32 and propagates in the core and inner cladding of the amplifying optical fiber 42. At this time, the pumping light supplied from the pumping light source 22 causes pumping of the Yb element added to the core 42a of the amplifying optical fiber 42.

The seed light outputted from the seed light source 10 is inputted into the amplifying optical fiber 41 through the optical isolator 61 and optical multiplexer 31 and guided and primary amplified in the core of the amplifying optical fiber 41. The seed light that has been primary amplified in the core of the amplifying optical fiber 41 is inputted into the amplifying optical fiber 42 through the optical isolator 62 and optical multiplexer 32 and undergoes secondary amplification in the core 42a of the amplifying optical fiber 42. The amplified seed light that has been secondary amplified in the amplifying optical fiber 42 propagates in the core 50a of the guiding optical fiber 50 and is outputted from the output optical system 70 to the outside via the optical isolator 63.

Further, of the pumping light outputted from the pumping light sources 21, 22, the pumping light (residual pumping light) that remains unused in the amplifying optical fibers 41, 42 is outputted from the amplifying optical fiber 42 as multimode light. Furthermore, the residual pumping light that is thus outputted propagates as multimode light inside the core 50a and inner cladding 501a of the guiding optical fiber 50 and then outputted from the output optical system 70 to the outside through the optical isolator 63.

Thus, the multimode residual pumping light (wavelength 980 nm) is outputted together with the single-mode amplified seed light (wavelength 1064 nm) from the guiding optical fiber 50. These amplified seed light and residual pumping light are outputted from the output optical system 70 to the outside through the optical isolator 63 to irradiate the object to be processed.

As a more specific example, the seed light outputted from the seed light source 10 is pulse light with a wavelength of 1064 nm and a pulse width of 100 nsec. The pumping light outputted from the pumping light sources 21, 22 is continuous light with a wavelength of 980 nm and a power of 5 W. The amplifying optical fiber 42 has a core radius of 5 μm, a cladding radius of 62.5 μm, a Yb-dopant concentration of 2000 wt.ppm, and an unsaturated absorption of 3 dB or more but 13 dB or less.

In this case, the pumping light supplied to the amplifying optical fiber 42 is absorbed by the Yb element at a ratio of several tens of percents, and the pumping light constituting the residual several percents (residual pumping light having a wavelength of 980 nm) propagates as a multimode light in the amplifying optical fiber 42 and guiding optical fiber 50 and then outputted as a multimode light from the optical fiber 50 guiding. The amplified seed light (having a wavelength of 1064 nm, a pulse width of 100 nsec) is outputted as a single-mode light from the guiding optical fiber 50.

The single-mode amplified seed light outputted from the guiding optical fiber 50 has high coherency and, therefore, can be converged, for example, with a converging lens with a focal distance of 50 mm. On the other hand, the multimode residual pumping light outputted from the guiding optical fiber 50 cannot be converged in the output optical system 70 and, therefore, illuminates a comparatively wide region on the object. In this case, the residual pumping light that illuminates the object as multimode light can be used as heating light for heating the vicinity of the converging point of the single-mode amplified pumping light.

Figure 3:
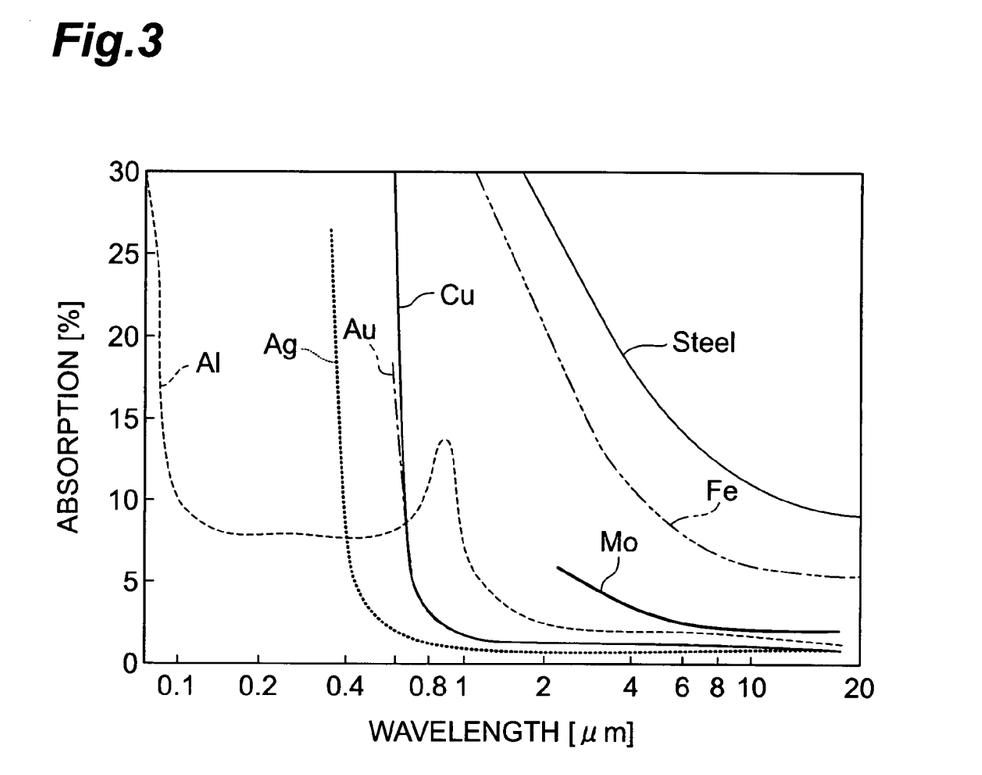
FIG. 3 shows absorption spectra of various metals that can be employed as a material of the object to be processed.

FIG. 3 shows absorption spectra of various metals that can be employed as a material of the object to be processed. As shown in FIG. 3, the absorption of metals is generally small at a wavelength of 1064 nm of the amplified seed light outputted from the fiber laser apparatus 1 according to the first embodiment; for example, the absorption ratio of copper (Cu) is merely about 2%. Therefore, in the case where a metal is irradiated only with the amplified seed light with a wavelength of 1064 nm, the processing efficiency of this metal is poor. However, in the fiber laser apparatus 1 according to the first embodiment, not only the amplified seed light with a wavelength of 1064 nm, but also the residual pumping light with a wavelength of 980 nm can be outputted. Thus, in the fiber laser apparatus 1 according to the first embodiment, since the object is heated by irradiation with the residual pumping light, laser processing can be performed with even higher efficiency by focused irradiation with the amplified seed light.

Second Embodiment

Figure 4A:
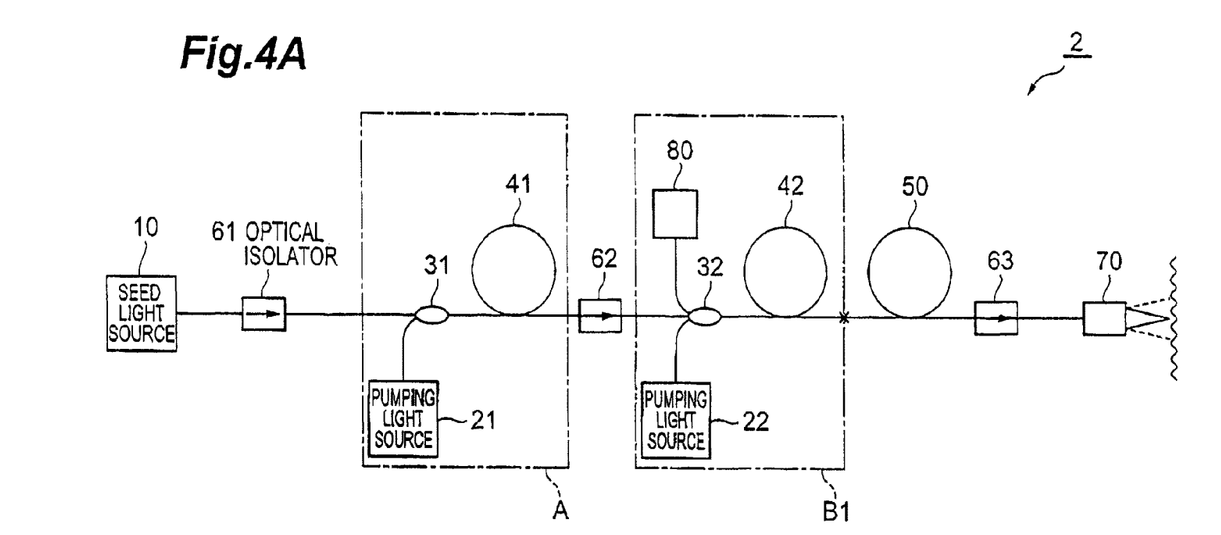
FIGS. 4A and 4B show a configuration of a second embodiment of a fiber laser apparatus according to the present invention.

Next, a second embodiment of a fiber laser apparatus and laser processing method according to the present invention will be explained. FIG. 4A shows a configuration of a second embodiment of a fiber laser apparatus according to the present invention. A fiber laser apparatus 2 according to the second embodiment has a MOPA configuration, as shown in FIG. 4A, that comprises a seed light source 10, pumping light sources 21, 22, optical multiplexers 31, 32, amplifying optical fibers 41, 42, a guiding optical fiber 50, optical isolators 61 to 63, an output optical system 70, and a light source 80 for heating. A pre-amplifying section A is constituted by the pumping light source 21, the optical multiplexer 31 and the amplifying optical fiber 41, and then a main amplifying section B1 of a cladding-pumping type is constituted by the pumping light source 22, the light source 80 for heating, the optical multiplexer 32 and the amplifying optical fiber 42.

As compared with the configuration of the fiber laser apparatus 1 according to the first embodiment shown in FIG. 1, the fiber laser apparatus 2 according to the second embodiment shown in FIG. 4A is different in the points that the heating light source 80 is further included and that the multiplexer 32 further multiplexes the heating light outputted from the heating light source 80.

The heating light source 80 outputs multimode heating light with a wavelength different from that of the pumping light. The multimode heating light is preferably continuous light and preferably has a wavelength with a large absorption by the object. For example, when the object is comprised of aluminum (Al), the multimode heating light supplied from the heating light source 80 preferably has a wavelength of 400 nm or more but 980 nm or less. Furthermore, it is preferred that a laser diode be used as the heating light source 80.

The optical multiplexer 32 outputs the seed light (light amplified by the pre-amplifying section A) that arrives from the optical isolator 62 together with the pumping light that arrives from the pumping light source 22 and the heating light that arrives from the heating light source 80 to the amplifying optical fiber 42. The heating light that is inputted into the amplifying optical fiber 42 propagates as a multimode light inside a core 42a (50a) and an inner cladding 421a (501a) of the amplifying optical fiber 42 and guiding optical fiber 50, respectively, and is used to irradiate the object through the optical isolator 63 and output optical system 70.

As a more specific example, the seed light outputted from the seed light source 10 is pulse light having a wavelength of 1064 nm and a pulse width of 100 nsec. The pumping light outputted from the pumping light sources 21, 22 is continuous light with a wavelength of 980 nm and a power of 5 W. The heating light outputted from the heating light source 80 is continuous light with a wavelength of 808 nm and a power of 5 W. The amplifying optical fiber 42 has a core radius of 5 µm, a cladding radius of 62.5 µm, a Yb-dopant concentration of 2000 wt.ppm, and an unsaturated absorption of 3 dB or more but 13 dB or less. The output optical system 70 has a converging lens with a focal distance of 50 mm and converges the single-mode amplified seed light to irradiate the object, but cannot converge the multimode light.

For example, when the object is an aluminum sheet with a thickness of 500 µm, the fiber laser apparatus 2 according to the second embodiment can output not only the amplified seed light with a wavelength of 1064 nm, but also the residual pumping light with a wavelength of 980 nm and heating light with a wavelength of 808 nm. Since the object can be heated not only with the pumping light, but also with the heating light, more effective laser processing can be performed by focused irradiation with the amplified seed light.

Figure 4B:
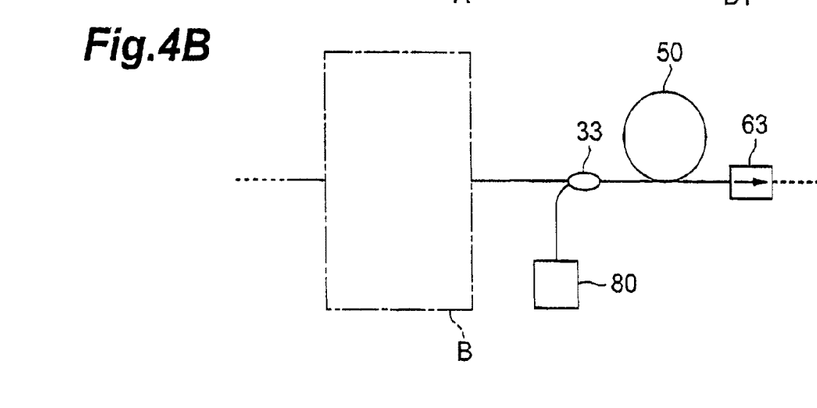

In the explanation of the second embodiment hereinabove, the heating light source 80 is arranged such that the heating light is supplied from a light incidence end side of the amplifying optical fiber 42. However, the arrangement of the heating light source 80 is not limited to the incidence end side of the amplifying optical fiber 42. Thus, as shown in FIG. 4B, the heating light source 80 may be arranged such that the heating light is supplied from the light incidence end side of the guiding optical fiber 50, through another optical multiplexer 33 provided between the amplifying optical fiber 42 and guiding optical fiber 50. In such configuration (FIG. 4B), the main amplifying section may have a configuration identical to that of the main amplifying section B in the fiber laser apparatus 1 according to the first embodiment.

As described hereinabove, in accordance with the present invention, laser processing and heating of the object are performed simultaneously by simultaneous irradiation with a plurality of laser beam components. Therefore, the object can be subjected to effective laser processing.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A fiber laser apparatus comprising:
    a seed light source outputting seed light;
    an amplifying section for amplifying the seed light by cladding-pumping, said amplifying section including:
        an amplifying optical fiber having a core extending along a predetermined axis, an inner cladding provided on an outer periphery of said core and having a refractive index lower than that of said core, and an outer cladding provided on an outer periphery of said inner cladding and having a refractive index lower than that of said inner cladding;
        an pumping light source outputting pumping light; and
        an optical multiplexers for supplying the seed light from said seed light source to said core of said amplifying optical fiber and supplying the pumping light from said pumping light source to said inner cladding of said amplifying optical fiber, whereby said amplifying optical fiber outputs single-mode amplified seed light that is amplified by cladding-pumping together with multimode residual pumping light;
    an output optical system irradiating an object with the single-mode amplified seed light and multimode residual pumping light that are outputted from said amplifying optical fiber, said output optical system converging the single-mode amplified seed light on the object; and
    a guiding optical fiber, for guiding the single-mode amplified seed light and multimode residual pumping light that are outputted from said amplifying optical fiber to said output optical system, provided between said amplifying optical fiber and said output optical system, said guiding optical fiber having a core extending along a predetermined axis, an inner cladding provided on an outer periphery of said core and having a refractive index lower than that of said core, and an outer cladding provided on an outer periphery of said inner cladding and having a refractive index lower than that of said inner cladding, whereby the single-mode amplified seed light outputted from said amplifying optical fiber propagates mainly in said core of said guiding optical fiber, and the multimode residual pumping light outputted from said amplifying optical fiber propagates mainly in said core and inner cladding of said guiding optical fiber.

2. A fiber laser apparatus according to claim 1, further comprising a heating light source outputting multimode light with a wavelength different from that of the pumping light, as heating light for heating the object,
   wherein the heating light from said heating light source is supplied, from a light incidence end of said amplifying optical fiber, into said amplifying optical fiber through said optical multiplexer.

3. A fiber laser apparatus according to claim 2, wherein said heating light source outputs continuous light as multimode heating light.

4. A fiber laser apparatus according to claim 1, further comprising:
   a heating light source outputting multimode light with a wavelength different from that of the pumping light, as heating light for heating the object; and
   a different optical multiplexer provided between said amplifying optical fiber and said guiding optical fiber,
   wherein the heating light from said heating light source is supplied, from a light incidence end of said guiding optical fiber, into said guiding optical fiber through said different optical multiplexer.

5. A fiber laser apparatus according to claim 2, wherein said heating light source outputs continuous light as multimode heating light.

6. A fiber laser apparatus according to claim 1, wherein said core of said amplifying optical fiber is doped with ytterbium of a concentration-length product such that unsaturated absorption of said amplifying optical fiber becomes 3 dB or more but 13 dB or less at a wavelength of the pumping light.

* * * * *